United States Patent Office 3,524,808
Patented Aug. 18, 1970

3,524,808
HYDROCRACKING CATALYST CONTAINING CARRIER TREATED WITH A SOLUTION OF $NH_4F$ IN $HNO_3$
Willem C. J. Quik, Pieter A. van Weeren, and Herman W. Kouwenhoven, Amsterdam, Netherlands, assignors to Shell Oil Company, New York, N.Y., a corporation of Delaware
No Drawing. Filed Feb. 6, 1968, Ser. No. 703,263
Claims priority, application Netherlands, Feb. 21, 1967, 6702572
Int. Cl. C10g 13/02; B01j 11/74, 11/78
U.S. Cl. 208—111　　　　　　　　　　　　　9 Claims

ABSTRACT OF THE DISCLOSURE

A process for preparation of a catalyst and a hydrocracking process using the catalyst which involves incorporation of fluorine into the catalyst refractory metal oxide carrier by impregnation from a solution of a fluoride compound in an acid such as nitric, formic or acetic acid either before or after impregnation of the oxide with a solution of hydrogenative metals and in which the oxide is dried after each impregnation and calcined after the last impregnation.

BACKGROUND OF THE INVENTION

Field of the invention

The invention relates to a process for the preparation of catalysts suitable for the hydrocracking of hydrocarbon oils.

Description of the prior art

Hydrocracking of hydrocarbon oils is well known in petroleum technology and is usually carried out at relatively high temperatures under hydrogen pressure in the presence of a catalyst having both a hydrogenation function and a cracking function. Hydrogenation function is supplied by hydrogenation metals as for example those of the sixth and/or eighth Group of the Periodic System of Elements, or compounds of these elements. Solid catalyst supports which have an acidic character therefore serve to provide a carrier for the metal and also act as the acidic component. Silica-alumina is an especially suitable carrier for hydrocracking catalysts.

The present invention relates to the preparation of hydrocracking catalysts which comprise a carrier material deriving its acidic function at least in part from the presence of fluorine.

Fluorine-containing catalysts for hydrocracking are known. For example, Netherlands patent application No. 6504682 describes a hydrocracking process using a catalyst which contains nickel and tungsten as metal components, alumina containing less than 5 percent by weight of silicon dioxide as carrier material, and which contains at least 3.5 percent by weight of fluorine. It is taught that the introduction of fluorine into the catalyst is effected by impregnation of the carrier with an aqueous solution of a fluorine compound. The treatment referred to may, if desired, be carried out either simultaneously with or after the impregnation with a metal salt solution, or be applied to the finished catalyst.

It has been found that when the fluorine is introduced into the catalyst in the manners described above, the fluorine is unevenly distributed over the carrier material or catalyst. Thus there is a considerably higher fluorine concentration at the periphery of the catalyst particle than in its center. This phenomenon becomes more pronounced as the size of the catalyst particles are increased as in the case of commercial catalysts for use in fixed beds.

The inhomogeneous distribution of fluorine over the catalyst particle leads to less selective hydrocarbon conversions due to excessively high cracking activity at the periphery and insufficient activity of the catalyst internal surface.

SUMMARY OF THE INVENTION

It has been found that a more uniform distribution of fluorine over the particles of oxidic carrier materials can be obtained if impregnation is carried out with a solution of the fluorine compound in an acid.

In broad aspect, the invention is a method of preparing a hydrocracking catalyst having a metallic hydrogenation component and fluorine disposed on a refractory oxide carrier material comprising impregnating a refractory oxide, preferably alumina, consecutively but in arbitrary order with (1) a solution of one or more fluorine compounds in an acid and (2) an aqueous solution of one or more hydrogenation metal salts, the oxide being dried and/or calcined after each impregnation.

The treatment with a solution of the fluorine compound in an acid may be carried out on the carrier material per se, or on a carrier material which contains catalytic metal components.

Suitable catalytic metal components are tungsten, molybdenum and/or nickel and cobalt and/or rhenium and palladium. These metals may be used alone or in combination as is often desirable. Thus, for example, combinations of nickel and tungsten or of cobalt and molybdenum are useful for many applications.

Impregnation of the carrier material with a mixture, i.e., a solution containing metal salt and fluorine compound as well as an acid, fails to effect the desired result, due to a precipitate formation in the solution, which impedes uniform impregnation of the carrier material.

Fluorine compounds which possess good solubility in the acid applied are desirably employed, i.e., those with a solubility of at least 2 moles per liter of acid and preferably at least 5 moles per liter of acid.

Examples of fluoride compounds which meet the above requirements are hydrofluoric acid, ammonium fluoride, ammonium bifluoride and fluorine-containing organic acids such as tri-fluoro-acetic acid. Especially preferred is hydrofluoric acid and particularly ammonium fluoride.

The acids used for dissolving the fluorine compounds may be used as such or diluted with water. Acids diluted with water are usually employed with a normality of 0.5 N or higher, preferably from 0.8 to 4 N. Both inorganic and organic acids may be used. Nitric acid is highly suitable, which in a 1 N concentration gives good results. Examples of organic acids which may be used are formic acid and acetic acid.

The concentration of fluorine compound(s) in the acid is determined by the desired amount of fluorine to be introduced into the carrier material. Depending on the absorptive power of the carrier material for water, the concentration of fluorine compound(s) should be chosen to give the desired fluorine content in a single impregnation. Of course, the fluorine content of the carrier material can be obtained by multiple impregnations with an acid having a lower concentration of fluorine compounds. Multiple impregnation has the disadvantage that the impregnated material must be dried between consecutive treatments.

When the carrier is an alumina type, it is desirable that the fluorine content be at least 0.5% w. and preferably more than 3% w. calculated on carrier material). Particularly active are catalysts having fluorine contents of from 6 to 10% w. (calculated on carrier material). By alumina-type carriers are particularly meant alumina, magnesia, zirconia, titania and/or thoria, having a silica content of less than 5% w.

If carrier materials are of the silica-alumina type, the silica-magnesia type or the like, fluorine content is determined by the combination of the acidic character of the silica-alumina and that of the added fluorine component. Hence, in these cases, to obtain a specific degree of acidity, a lower fluorine content will suffice. As a rule, catalysts with silica-containing carrier materials will contain from 0.5 to 5 percent by weight of fluorine (calculated on carrier material).

The choice of a certain carrier material, in regard to the silica content versus the fluorine content, is also influenced by the nature of the hydrocarbon oil used as starting material for the hydrocracking. Thus, for example, for the hydrocracking of high-boiling hydrocarbon oil fractions, such as flashed distillates, catalysts based on fluorine-containing alumina-type carrier materials may very suitably be employed. For the hydrocracking of low-boiling fractions, for example, for the preparation of gasoline components, catalysts based on fluorine-containing silica-alumina type of carrier materials are usually preferred.

Catalysts based on fluorine-containing silica-magnesias may be advantageous, since they possess excellent hydrogenation properties.

The catalysts based on silica-type carrier materials as a rule have a silica content of less than 95% w., and preferably of from 30 to 90% w.

As has already been observed, the beneficial effect of a uniform impregnation according to the invention will manifest itself most clearly with catalysts based on a carrier material consisting of relatively large particles, as those used in commercial plants. The average diameter of the particles contemplated varies between 1 and 15 mm., and—for example—between 1.5 and 10 mm.

The impregnation with the solution of the fluorine compound(s) and the solution of the metal salts may—if desired—be carried out in an arbitrary sequence. Generally, however, it is preferred to first treat the carrier material with a solution of one or more fluorine compounds in an acid and then to impregnate it with a solution of one or more salts of the metals tungsten, molybdenum and/or nickel and cobalt and/or rhenium and palladium. After the first treatment, impregnated material is dried at temperatures of, for instance, from 100 to 120° C., in order to obtain an expeditious and complete impregnation with the metal salt solution. After the second impregnation, the metal is again dried and is calcined in the usual manner at—for example—from 400 to 500° C., to convert the metal salts into the corresponding oxides.

To obtain hydrocracking catalysts with an active hydrogenation function, it is desirable to subject the catalyst to a sulfiding treatment. The sulfidation may be carried out in the gas phase or liquid phase and, as a rule, at an elevated temperature, for example, 350–450° C., by contacting with a mixture of hydrogen and hydrogen sulfide, carbon disulfide and/or one or more mercaptans. Sulfur-containing hydrocarbon fraction, for example, a gasoline, kerosene, or gas oil, may also be employed for sulfiding. The sulfur content of the sulfided catalyst should be in general from 70 to 100% of the theoretical amount to convert the metal components to their corresponding sulfides.

Catalysts employing tungsten or molybdenum and nickel or cobalt as metal components should as a rule have metal contents from about 10 to 30% w. and preferably from 15 to 25% w. (calculated on total catalyst). The atomic ratio of the metals tungsten and molybdenum to the metals nickel and cobalt should be between 10 and 0.5, and preferably between 5 and 1. This type of catalyst may, if desired, additionally contain copper and/or silver.

Catalysts employing rhenium and/or palladium as metal components should contain, as a rule, from 0.5 to 5% w. and preferably from 1 to 2% w. metals.

The catalysts according to the invention possess a high activity, i.e., in comparison with known catalysts, a high conversion can be obtained at relatively low temperatures. This is highly advantageous in enhancing the catalyst life. During the gradual decrease of the catalyst activity, which occurs when the catalyst is used for an extensive period of time in a continuous process, it is possible—as is known—to maintain the conversion at the desired level by increasing reaction temperature. The final temperature, for technical and other reasons, is limited to about 475° C.; thus longer catalyst life is possible with the present catalyst because of the relatively lower starting temperature.

The catalyst may be regenerated by an oxidative treatment at elevated temperature, using oxygen-containing gas mixtures such as mixtures of air and nitrogen and/or steam. After the regeneration, which is carried out at a maximum of about 500° C., the catalyst—after sulfidation—has in many cases an activity which differs little from the initial activity. Several regeneration treatments may be carried out without dropping the activity to an unacceptable value.

The invention also relates to a process for the hydrocracking of hydrocarbon oils by comprising contacting the oils with the present fluoride-containing catalysts at elevated temperature under hydrogen pressure.

Various hydrocarbon oil fractions as those obtained by direct distillation and catalytic cracking may be used as feed stocks. Thus, for example, higher boiling hydrocarbon oil distillates, so-called flashed distillates or deasphalted residues having a boiling range above 350° C. can be converted to middle distillates such as gas oils and kerosenes by hydrocracking. Low-boiling hydrocarbon oils—such as gas oil fractions—having a boiling range which lies substantially below 350° C. can be hydrocracked to products within the gasoline boiling range.

The hydrogenative cracking reaction is generally carried out under a high hydrogen pressure, i.e., at hydrogen partial pressures between 25 and 300 atm. gauge and preferably between 50 and 200 atm. gauge. The temperatures can be relatively low due to the high activity of the present catalysts. Temperatures generally range between 250 and 475° C. and as a rule between 300 and 430° C.

The temperature has a substantial influence on the results of the process; higher temperatures resulting in greater conversion. Definite temperature limits cannot be given since the reaction temperature is also determined by the nature of the starting material.

The reactor temperature is generally adjusted to obtain a conversion per pass, of at least about 40% w. Preferably, at least 50% w. conversion is obtained. By conversion is meant the production of products boiling below the initial boiling point of the feed.

In a preferred embodiment, hydrocarbon oil to be hydrocracked is passed continuously over a sulfided catalyst based on a fluorine-containing carrier material, at a temperature between 300 and 430° C., under a hydrogen partial pressure between 50 and 200 atm. gauge, at a space velocity of from 0.5 to 3 liters of oil per hour per liter of catalyst, and hydrogen to oil ratio of from 250 to 2500 standard liters per liter of oil.

Preferably, the catalyst contains tungsten or molybdenum and nickel or cobalt as metal components in an amount ranging from 10 to 30% w. and preferably from 15 to 25% w. (calculated on total catalyst) and in which the atomic ratio of the metals tungsten and molybdenum to the metals nickel and cobalt lies between 5 and 1. Other suitable catalysts contain rhenium and/or palladium as metal components, in an amount ranging from 0.5 to 5% w. and preferably to from 1 to 2% w.

EXAMPLE

In order to demonstrate the effect of the impregnation of alumina with a solution of a fluorine compound in aqueous nitric acid on the activity and the selectivity of a sulfided, fluorine-containing tungsten-nickel-alumina catalyst, six comparative tests were carried out. The catalyst was composed of 100 parts by weight of alumina, 1.4 parts by weight of nickel, 8.8 parts by weight of tungsten, and 8 parts by weight of fluorine. The dimensions of the extruded catalyst particles were 1.5 mm.

Prior to testing, the catalyst was sulfided with a mixture of hydrogen and hydrogen sulfide at a pressure of 10 atm. abs.; during the sulfidation the temperature was gradually increased from 20° C. to 375° C.

For these tests a flashed distillate, originating from a Middle-East crude, was used.

The reaction conditions were as follows:
Pressure: 100 kg./cm.$^2$ abs.
Temperature: 400° C.
Space velocity: 1 liter of distillate per liter of catalyst per hour.
Hydrogen: 2000 standard liters per liter of distillate.

The results of these experiments are shown in the following table.

In all cases 1 N nitric acid was used. The final boiling point was set at an assumed, constant cloud point of −15° C.

Comparison of the results shows that the highest conversion selectivity for the preparation of a middle distillate is obtained with a catalyst impregnated with a solution of ammonium fluoride in 1 N nitric acid. Very good results were obtained with a catalyst impregnated with a solution of hydrofluoric acid in 1 N nitric acid. The least satisfactory results have been obtained with a catalyst impregnated with a solution of ammonium fluoride in water, without the use of nitric acid.

nating solution is an aqueous mixture of the fluoride compound and acid, and the concentration of fluoride compound is at least 2 moles per liter of acid.

3. The improvement of claim 2 wherein the fluoride is selected from the group consisting of hydrofluoric acid and ammonium fluoride and the acid is an aqueous solution of at least 0.5 normality.

4. The improvement of claim 1 wherein the refractory oxide is a carrier selected from the group consisting of alumina, magnesia, zirconia, titania, and thoria, having a silica content of less than 5% weight, and a particle size of from 1–15 mm.

5. The improvement of claim 2 wherein the refractory metal oxide is first impregnated with the solution of fluoride compound in acid, dried at a temperature of from 100 to 200° C. and subsequently impregnated with an aqueous solution of salts of metal components selected from the group consisting of tungsten, molybdenum, nickel, cobalt, rhenium, palladium and mixtures thereof, dried and calcined.

6. In a continuous process for the production of middle distillates from heavy hydrocarbon oils wherein the heavy oils are hydrocracked in the presence of hydrogen at elevated temperature and pressure and a catalyst containing hydrogenative metal and 0.5 to 10% by weight fluoride on a refractory metal oxide, the improvement which comprises the use of a catalyst which is prepared by impregnation of a refractory oxide consecutively but in arbitrary order with (a) a solution of a fluoride selected from the group consisting of hydrofluoric acid,

TABLE

| | Method of impregnation with the fluorine compound | | | | | |
|---|---|---|---|---|---|---|
| | NH$_4$F in H$_2$O | NH$_4$F in HNO$_3$ | HF in H$_2$O | HF in HNO$_3$ | HNO$_3$ followed by calcination, then NH$_4$F | NH$_4$F followed by calcination, then HNO$_3$ |
| Test No. | 1 | 2 | 3 | 4 | 5 | 6 |
| Product breakdown, calculated on liquid product, percent w. fraction: | | | | | | |
| <100° C | 4.2 | 3.6 | 3.4 | 3.8 | 3.0 | 3.7 |
| 100–150° C | 6.1 | 5.0 | 4.9 | 5.8 | 5.7 | 5.3 |
| 150–250° C | 11.2 | 14.6 | 11.9 | 13.3 | 12.2 | 12.6 |
| 250–340° C | 17.2 | 23.1 | 22.1 | 23.2 | 24.7 | 19.6 |
| 340–360° C | 6.4 | 9.6 | 8.2 | 8.4 | 4.2 | 7.5 |
| 360–375° C | 6.6 | 5.6 | 6.6 | 7.0 | 6.4 | 5.3 |
| >375° C | 48.3 | 38.5 | 42.9 | 31.5 | 43.8 | 46.0 |
| Middle distillate: | | | | | | |
| Initial boiling point 150° C. (cloud point −15° C.) | | | | | | |
| Final boiling point, °C | 355 | 355/360 | 350 | 355 | 350 | 355 |
| Yield of liquid product, percent w. | 33 | 46 | 37 | 42 | 37 | 37 |
| Selectivity,[1] percent | 76 | 85 | 82 | 82 | 80 | 81 |
| Conversion[2] | 44 | 55 | 46 | 51 | 47 | 46 |

[1] Selectivity is defined as:
$$\frac{\text{The yield of middle distillate in percent w.}}{\text{Percent w. yield of middle distillate plus percent w. fraction} <150° \text{C.}} \times 100\%$$

[2] Conversion is defined as the percent w. yield of middle distillate plus percent w. fraction <150° C.

We claim as our invention:

1. In a process for the preparation of hydrocracking catalysts having a hydrogenative metal component disposed on a refractory metal oxide and containing 0.5% to 10% by weight fluoride, the improvement which comprises impregnating the refractory metal oxide consecutively but in arbitrary order with:
   (a) a solution of a fluoride selected from the group consisting of hydrofluoric acid, ammonium fluoride, ammonium bifluoride and tri-fluoro-acetic acid, in an acid selected from the group consisting of nitric, formic and acetic acids; and
   (b) an aqueous solution of one or more salts of metals selected from the group consisting of tungsten, molybdenum, nickel, cobalt, rhenium, palladium and mixtures thereof;
   the improvement being further characterized in that the refractory metal oxide is dried after each impregnation and calcined after the last impregnation.

2. The improvement of claim 1 wherein the impregnating solution is an aqueous mixture of the fluoride compound and acid, and the concentration of fluoride ammonium fluoride, ammonium bifluoride and tri-fluoro-acid in an acid selected from the group consisting of nitric, formic and acetic acids, and (b) an aqueous solution of salts of metals selected from the group consisting of tungsten, molybdenum, nickel, cobalt, rhenium, palladium and mixtures thereof, the refractory oxide being dried after each impregnation and calcined after the final impregnation.

7. The improvement of claim 6 wherein the catalyst contains a mixture of metal components selected from the group consisting of tungsten-nickel, tungsten-cobalt, molybdenum-nickel, and molybdenum-cobalt, the reaction is carried out a ta temperature between 250 and 475° C. and at a hydrogen pressure of between 25 and 300 atmospheres under conditions such that at least 40% conversion of the starting oil is converted into a product which has a boiling point below the initial boiling point of the starting oil.

8. The improvement of claim 1 wherein the acid is HNO$_3$.

9. The improvement of claim 6 wherein the acid is $HNO_3$.

References Cited
UNITED STATES PATENTS

| | | | |
|---|---|---|---|
| 2,428,741 | 10/1947 | Plank | 252—441 XR |
| 3,239,450 | 3/1966 | Lindquist et al. | 252—441 XR |
| 3,360,457 | 12/1967 | Peck et al. | 208—111 XR |
| 3,432,441 | 3/1969 | Gardner | 252—441 |
| 3,436,338 | 4/1969 | Pratt et al. | 208—111 XR |

PATRICK P. GARVIN, Primary Examiner

U.S. Cl. X.R.

208—112; 252—439, 441

PO-1050
(5/69)

UNITED STATES PATENT OFFICE
CERTIFICATE OF CORRECTION

Patent No. 3,524,808         Dated  August 18, 1970

Inventor(s) Willem C. J. Quik, Pieter A. van Weeren and Herman W. Kouwenhoven

It is certified that error appears in the above-identified patent and that said Letters Patent are hereby corrected as shown below:

Claim 6, line 11, insert -- acetic -- after "tri-fluoro-".

SIGNED AND
SEALED
NOV 17 1970

(SEAL)
Attest:

Edward M. Fletcher, Jr.
Attesting Officer

WILLIAM E. SCHUYLER, JR.
Commissioner of Patents